United States Patent Office 2,716,669
Patented Aug. 30, 1955

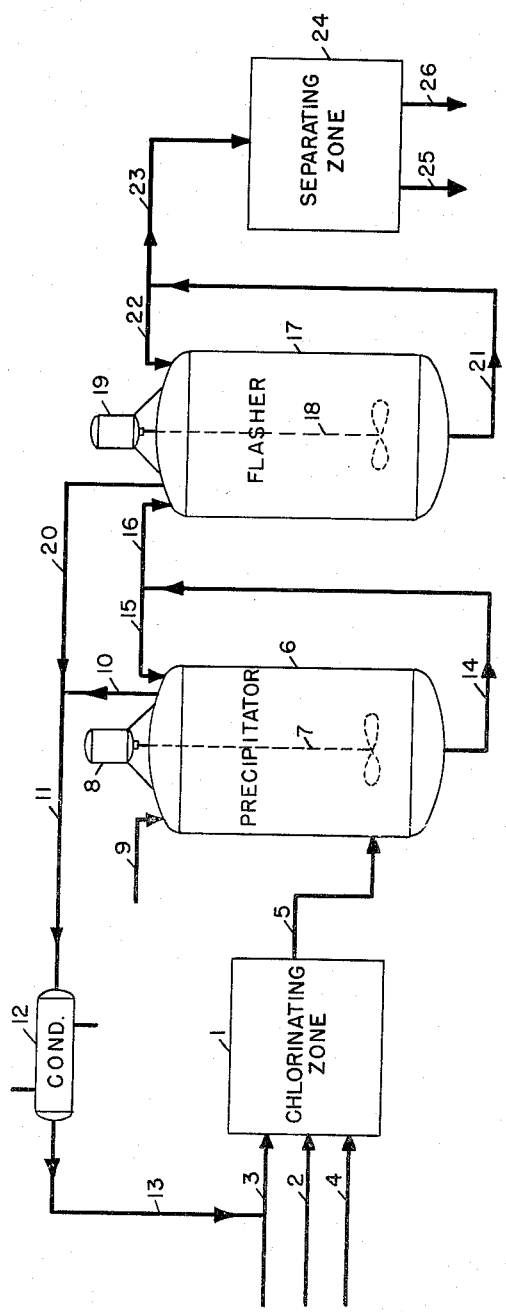
WILLIAM H. F. FRAVEL
INVENTOR.

2,716,669

CONTINUOUS PRECIPITATION OF CHLORINATED RUBBER

William H. F. Fravel, Metuchen, N. J., assignor to Hercules Powder Company, Wilmington, Del., a corporation of Delaware Application February 25, 1953, Serial No. 338,861

7 Claims. (Cl. 260—772)

This invention relates to the precipitation of chlorinated rubber. In a specific aspect this invention relates to the continuous precipitation of chlorinated rubber in finely divided form from a solution in which the rubber has been chlorinated.

In the manufacture of chlorinated rubber it has been a problem to provide an efficient and economical method for the precipitation of solid chlorinated rubber from the solution in which chlorination of the rubber is effected. Chlorinated rubber as precipitated by prior art methods is usually a clumpy product, while a fine powder is desired. The clumpy product can be comminuted by milling operations, but such comminution requires an additional operation or step in the manufacturing process.

In the usual procedures for chlorinating rubber, natural or synthetic rubber is dissolved in a volatile water-immiscible solvent that is not readily reactive with chlorine. Halogenated hydrocarbons, such as carbon tetrachloride, are the preferred solvents. Gaseous chlorine is passed through the solution to react with the rubber until the desired stage of chlorination is reached. For many commercial products, a chlorinated rubber containing about 67% or more of chlorine is desired. In any event, after conclusion of the chlorination, there is obtained a chlorinated rubber in solution, and it is necessary to separate the chlorinated rubber from the carbon tetrachloride or other solvent.

For separating or recovering the chlorinated rubber from solution, various methods have been proposed. For example, it has been suggested that a thin stream of chlorinated rubber solution be added slowly to a large volume of a nonsolvent, such as an alcohol, with violent agitation. Alternatively, it has been proposed to add an alcohol gradually to a large volume of chlorinated rubber solution with considerable agitation. Another suggested procedure involves emulsifying the chlorinated rubber solution and then removing the carbon tetrachloride or other solvent by steam distillation. It has also been suggested that a thin stream of chlorinated rubber solution be introduced into boiling water which is violently agitated. The precipitated solid is then recovered from the water while the evaporated solvent is recovered elsewhere. It has been found difficult, however, to recover the solvent without substantial losses and to recover a uniform solid chlorinated rubber not requiring comminution and completely free of carbon tetrachloride or other solvent.

In accordance with this invention chlorinated rubber is precipitated in a continuous process by introducing a solution of the chlorinated rubber to a first zone containing a body of hot water maintained at a temperature not more than about 10° C. above the boiling point of the solvent in said solution. The chlorinated rubber is precipitated in the hot water and a portion of the solvent is evaporated. A slurry of chlorinated rubber in water is then passed to a second zone maintained at a higher temperature than the hot water in said first zone, and additional solvent is evaporated from the chlorinated rubber. The resulting chlorinated rubber is then recovered in a finely divided form and substantially free of solvent.

The invention will be described in detail by referring to the accompanying drawing which is a schematic flow diagram of a preferred procedure for carrying out the invention. The description of this drawing also represents a specific example of one method of practicing the invention. Referring now to the accompanying drawing, either natural or synthetic rubber is chlorinated in zone 1 by any of the well-known procedures for chlorinating rubber. Rubber and solvent, for example, carbon tetrachloride, are introduced to zone 1 via lines 2 and 3, respectively. Sufficient chlorine is introduced to zone 1 via line 4 to produce a chlorinated rubber containing about 62–70% chlorine. After the rubber has undergone sufficient chlorination, the solution of chlorinated rubber in carbon tetrachloride is passed via line 5 to precipitator 6 containing agitator 7 operated by driving mechanism 8. Precipitator 6 contains hot water introduced via line 9 at a temperature not more than about 10° C. above the boiling point of the carbon tetrachloride. If desired, line 9 may contain a temperature-regulated valve for introducing sufficient steam to maintain the desired temperature level in precipitator 6. The solution entering precipitator 6 via line 5 is sprayed into the body of liquid in the precipitator through a nozzle set below the upper liquid level. The chlorinated rubber solution is agitated in the body of hot water and the carbon tetrachloride solvent is vaporized and withdrawn from the precipitator via line 10 and passed via line 11 to condenser 12. The condensed carbon tetrachloride is then recycled to chlorinating zone 1 via lines 13 and 3. Chlorinated rubber is precipitated in precipitator 6 in a finely divided form and it forms a slurry in the body of hot water. The chlorinated rubber concentration or consistency of this slurry is maintained within the range of 1% to 20%, preferably 5% to 18% by weight. A portion of this slurry is continuously removed from precipitator 6 at a point below the upper level of the slurry in precipitator 6 and preferably from the bottom of precipitator 6. It is important that the slurry be removed from a low level in precipitator 6 since the chlorinated rubber has a tendency to hold back or re-absorb carbon tetrachloride passing through the slurry, and such re-absorption of carbon tetrachloride increases the tendency of the chlorinated rubber particles to stick together. A portion of the slurry removed from precipitator 6 is continuously recycled via line 15 in order to maintain the consistency of the slurry in precipitator 6 within the desired limits. When high recycle rates are employed, mechanical agitation of the slurry in precipitator 6 is unnecessary. Chlorinated rubber solution and hot water are introduced via lines 5 and 9, respectively, at rates such that the slurry level in precipitator 6 is maintained substantially constant.

The temperature of the hot water or slurry in precipitator 6 is maintained within the range of about 78°–85° C. when carbon tetrachloride is the solvent employed. If too low a temperature is used, the carbon tetrachloride is released too slowly from the solution and the resulting precipitate is undesirably dense. If higher temperatures are employed, the precipitated chlorinated rubber is fluffy and bulky. The preferred precipitating temperature is within the range of 80°–83° C. when carbon tetrachloride is the solvent.

The chlorinated rubber removed from precipitator 6 contains as much as 1 to 2.5% by weight and more carbon tetrachloride. In order to remove the carbon tetrachloride substantially completely from the chlorinated rubber, a portion of the slurry passing via line 14 is passed via line 16 to flashing zone 17 provided with agitator 18 operated by driving mechanism 19. Flashing zone 17 is heated by steam or other means to a temperature above the temperature in precipitator 6. Actually, the temperature in zone 17 is within the range of 95°–100° C., and at this temperature the carbon tetrachloride remaining in the chlorinated rubber is evaporated and withdrawn via line 20. This withdrawn carbon tetrachloride then passes via line 11 to condenser 12 and it is then recycled to chlorinating zone 1 via lines 13 and 3. Flashing zone 17 is operated in a manner similar to precipitator 6. A slurry of chlorinated rubber in water is withdrawn via line 21, and a portion of this slurry is recycled to zone 17 via line 22 in order to maintain the slurry level and slurry consistency substantially constant in zone 17. The consistency in zone 17 is within the range of 1 to 20%, preferably 5 to 18% by weight. Another portion of the slurry passing via line 21 is passed via line 23 to separating zone 24 where the finely divided chlorinated rubber substantially free of carbon tetrachloride is separated from the water. Any suitable means for separating, such as filtration, centrifugation, decantation, and the like, can be used for separation. The finely divided rubber is removed as a product of the process via line 25 and the water is removed via line 26. This water can then be reheated, if necessary, and recycled to precipitator 6 via line 9.

Alternatively, flashing zone 17 can be operated by an overflow method. A slurry of chlorinated rubber is removed from the upper liquid level in zone 17 by a suitable overflow pipe and the removed slurry is passed to zone 24. The quantity of slurry thus removed is controlled by the amount of incoming slurry entering zone 17 via line 16. In this alternative method of separation, no recycle of the slurry is employed.

As previously indicated, the chlorinated rubber removed from precipitator 6 contains a small amount of carbon tetrachloride. In some uses this small amount of carbon tetrachloride can be tolerated and, if the loss of this carbon tetrachloride is not undesirable, it is unnecessary to treat the chlorinated rubber to completely remove the carbon tetrachloride. In that event, the water slurry of chlorinated rubber that is removed from precipitator 6 via lines 14 and 16 can be passed directly to separating zone 24 without passage through flashing zone 17. In this alternative procedure, precipitator 6 is operated in the manner described above and at a temperature not more than about 10° C. above the temperature of the solvent.

The precipitation of chlorinated rubber by the procedure of this invention produces a uniform finely divided precipitate that does not require milling or other comminution. Also, the precipitation is easily controlled without any danger of plug-up in the system. In the prior art methods of separating, milling of the precipitated chlorinated rubber was ordinarily required, and in many instances the precipitated chlorinated rubber was such that it plugged up the system. Furthermore, in the preferred method of effecting this invention, there is no loss of carbon tetrachloride in the precipitated product since the product of the process is substantially free of solvent.

The employment of this invention makes it possible to increase the output of precipitated chlorinated rubber when compared with prior art procedures. With this procedure it is possible to precipitate more chlorinated rubber in two vessels, i. e., the precipitator and flashing unit, than it was possible to precipitate in three vessels by the batch procedures of the prior art. Also, in the prior art it was ordinarily necessary to employ metal precipitators since it was usually necessary to chop out or remove in some other manner the lumps of chlorinated rubber with heavy metal bars, axes and the like. With this procedure no such means of removal is necessary, and, if desired, glass-lined equipment can be used. The use of glass-lined equipment is desirable since it prevents contamination of the product by the metal lining of the precipitator.

From the above description various alternative procedures within the scope of this invention will be apparent to those skilled in the art.

What I claim and desire to protect by Letters Patent is:

1. The continuous process for preparing chlorinated rubber in finely divided form which comprises continuously introducing a solution of chlorinated rubber into a first zone containing a body of hot water maintained at a temperature not more than 10° C. above the boiling point of the solvent in said solution, maintaining the consistency of the resulting slurry substantially constant within the range of 1% to 20% by weight, precipitating chlorinated rubber in said body of water and evaporating only a portion of the solvent from said chlorinated rubber, continuously passing resulting slurry of chlorinated rubber in water to a second zone maintained at a temperature above the temperature of said body of water, and evaporating additional solvent from chlorinated rubber in said second zone.

2. The continuous process for preparing chlorinated rubber in finely divided form which comprises continuously introducing a solution of chlorinated rubber in carbon tetrachloride into a first zone containing a body of water maintained at a temperature within the range of 78° to 85° C., maintaining the consistency of the resulting slurry substantially constant within the range of 1% to 20% by weight, precipitating chlorinated rubber in said body of water and evaporating only a portion of the carbon tetrachloride from said chlorinated rubber, continuously passing resulting slurry of chlorinated rubber in water to a second zone maintained at a temperature within the range of 95° to 100° C., and evaporating additional carbon tetrachloride from chlorinated rubber in said second zone.

3. The continuous process for preparing chlorinated rubber in finely divided form and completely free of solvent which comprises continuously introducing a solution of chlorinated rubber in carbon tetrachloride into a first zone containing a body of water maintained at a temperature within the range of 78° to 85° C., maintaining the consistency of the resulting slurry substantially constant within the range of 1% to 20% by weight, precipitating chlorinated rubber in said body of water and evaporating only a portion of the carbon tetrachloride from said chlorinated rubber, continuously withdrawing slurry from said first zone at a point below the upper liquid level in said first zone, continuously passing withdrawn slurry to a second zone maintained at a temperature within the range of 95° to 100° C., and evaporating additional carbon tetrachloride from chlorinated rubber in said second zone.

4. The continuous process for preparing chlorinated rubber in finely divided form and completely free of solvent which comprises continuously introducing a solution of chlorinated rubber in carbon tetrachloride into a first zone containing a body of water maintained at a temperature within the range of 78° to 85° C., precipitating chlorinated rubber in said body of water and evaporating only a portion of the carbon tetrachloride from said chlorinated rubber, continuously withdrawing slurry from said first zone at a point below the upper liquid level in said first zone, continuously recycling a portion of said withdrawn slurry to said first zone to maintain the consistency of the slurry in said first zone substantially constant within the range of 1% to 20% by weight, continuously passing the remaining portion of said withdrawn slurry to a second zone maintained at a temperature within the range of 95° to 100° C., and evaporating additional carbon tetrachloride from chlorinated rubber in said second zone.

5. The continuous process for preparing chlorinated rubber in finely divided form which comprises continuously introducing a solution of chlorinated rubber into a precipitating zone containing a body of hot water maintained at a temperature not more than 10° C. above the boiling point of the solvent in said solution, maintaining the consistency of the resulting slurry substantially constant within the range of 1% to 20% by weight, precipitating chlorinated rubber in said body of water and evaporating solvent from said chlorinated rubber, continuously withdrawing resulting slurry from said precipitating zone at a point below the upper level of said body of water, continuously returning a portion of said withdrawn slurry to said precipitating zone, and recovering chlorinated rubber in a finely divided form from the remainder of said withdrawn slurry.

6. The process for preparing chlorinated rubber in finely divided form which comprises continuously introducing a solution of chlorinated rubber in carbon tetrachloride as a solvent into a precipitating zone containing a body of hot water maintained at a temperature within the range of 78° to 85° C., maintaining the consistency of the resulting slurry substantially constant within the range of 5% to 18% by weight, precipitating chlorinated rubber in said body of water and evaporating solvent from said chlorinated rubber, continuously withdrawing resulting slurry from said precipitating zone at a point below the upper level of said body of water, continuously returning a portion of said withdrawn slurry to said precipitating zone, and recovering chlorinated rubber in a finely divided form from the remainder of said withdrawn slurry.

7. The continuous process for preparing chlorinated rubber in finely divided form which comprises continuously introducing a solution of chlorinated rubber into a precipitating zone containing a body of hot water maintained at a temperature not more than 10° C. above the boiling point of the solvent and said solution, maintaining the consistency of the resulting slurry substantially constant within the range of 1% to 20% by weight, precipitating chlorinated rubber in said body of water and evaporating solvent from said chlorinated rubber, and continuously withdrawing resulting slurry containing chlorinated rubber in finely divided form from the precipitation step.

References Cited in the file of this patent

UNITED STATES PATENTS

| | | |
|---|---|---|
| 2,165,682 | Stern | July 11, 1939 |
| 2,375,958 | Stevenson | May 15, 1945 |
| 2,495,137 | Rowland | Jan. 17, 1950 |